(12) United States Patent
Bharadwaj et al.

(10) Patent No.: US 11,463,972 B2
(45) Date of Patent: Oct. 4, 2022

(54) SIDELINK PRIMARY AND SECONDARY SYNCHRONIZATION SIGNAL TRANSMISSION

(71) Applicant: QUALCOMM Incorporated, San Diego, CA (US)

(72) Inventors: Arjun Bharadwaj, Cupertino, CA (US); Kapil Gulati, Hillsborough, NJ (US); Shuanshuan Wu, San Diego, CA (US); Tien Viet Nguyen, Bridgewater, NJ (US); Sudhir Kumar Baghel, Hillsborough, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/898,070

(22) Filed: Jun. 10, 2020

(65) Prior Publication Data

US 2020/0396708 A1    Dec. 17, 2020

Related U.S. Application Data

(60) Provisional application No. 62/860,699, filed on Jun. 12, 2019.

(51) Int. Cl.
*H04W 56/00* (2009.01)
*H04W 52/54* (2009.01)

(52) U.S. Cl.
CPC ....... *H04W 56/0015* (2013.01); *H04W 52/54* (2013.01)

(58) Field of Classification Search
CPC ... H04W 52/00–60; H04W 56/00–0095; H04J 11/0073; H04J 11/0076
See application file for complete search history.

(56) References Cited

U.S. PATENT DOCUMENTS

| 9,264,216 B1* | 2/2016 | Vu | H04W 56/00 |
| 11,012,225 B1* | 5/2021 | Lu | H04L 27/2655 |
| 2013/0121299 A1* | 5/2013 | Kim | H04W 72/10 |
| | | | 370/329 |

(Continued)

OTHER PUBLICATIONS

CATT: "Feature Lead Summary on AI 7.2.4.3 Sidelink Synchronization Mechanism", 3GPP TSG RAN WG1 #97, R1-1907721, Reno, USA, May 13, 2019-May 17, 2019, 19 Pages, Retrieved from the Internet: URL: http://www.3gpp.org/ftp/tsg%5Fran/WG1%5FRL1/TSGR1%5F97/Docs/R1%2D1907721%2Ezip. [retrieved on May 16, 2019] Sections 4.1 and 4.2.

(Continued)

*Primary Examiner* — Raymond S Dean
(74) *Attorney, Agent, or Firm* — Arent Fox LLP/Qualcomm Incorporated

(57) ABSTRACT

Apparatus and methods for S-SSB transmission are provided. In an aspect, an S-SSS symbol is followed by a gap symbol. In another aspect, a first PSBCH symbol is followed by an S-SSS symbol. In a further aspect, the same MPR is used for the entire S-SSB, thus reducing/mitigating transient periods. For example, the S-SSS symbols in the S-SSB may be selected from a set of sequences having the same MPR as the S-PSS symbols. Alternatively, the MPR of the entire S-SSB may be selected based on a sequence ID of an S-SSS. In an aspect, additional symbols may be configured in the S-SSB to compensate for power reduction.

12 Claims, 13 Drawing Sheets

(56) References Cited

U.S. PATENT DOCUMENTS

| | | | |
|---|---|---|---|
| 2017/0208494 A1* | 7/2017 | Moon | H04W 16/28 |
| 2020/0245272 A1* | 7/2020 | Hong | H04W 4/40 |
| 2020/0280398 A1* | 9/2020 | Hwang | H04W 72/042 |
| 2020/0322095 A1* | 10/2020 | Park | H04L 5/0094 |
| 2021/0242975 A1* | 8/2021 | Kim | H04L 5/0091 |

OTHER PUBLICATIONS

CATT: "Feature Lead Summary on AI 7.2.4.3 Sidelink Synchronization Mechanism", 3GPP TSG RAN WG1 #97, R1-1907926, Reno, USA, May 13, 2019-May 17, 2019, 19 pages, Retrieved from the Internet: URL: http://www.3gpp.org/ftp/tsg%5Fran/WG1%5FRL1/TSGR1%5F97/Docs/R1%2D1907926%2Ezip. [retrieved on May 20, 2019], Sections 4.1, 4.2.

International Search Report and Written Opinion—PCT/US2020/037258—ISA/EPO—dated Oct. 9, 2020.

Mediatek Inc: "Discussion on Sidelink Based Synchronization Mechanism", 3GPP TSG RAN WG1 #97, R1-1906556, Reno, USA, May 13, 2019-May 17, 2019, 9 pages, Retrieved from the Internet: URL: http://www.3gpp.org/ftp/Meetings%5F3GPP%5FSYNC/RAN1/Docs/R1%2D1906556%2Ezip. [retrieved on May 13, 2019] figure 3 Section 4.

Qualcomm Incorporated: "Synchronization Design for NR V2X", 3GPP TSG RAN WG1 #97, R1-1907272, Reno, USA, May 13, 2019-May 17, 2019, 12 pages, Retrieved from the Internet: URL: http://www.3gpp.org/ftp/Meetings%5F3GPP%5FSYNC/RAN1/Docs/R1%2D1907272%2Ezip. [retrieved on May 13, 2019] figure 2 Section 2.2.

ZTE., et al., "Discussion on Synchronization Mechanism in NR V2X", 3GPP TSG RAN WG1 #97, R1-1906462, Reno, USA, May 13, 2019-May 17, 2019, 8 pages, Retrieved from the Internet: URL: http://www.3gpp.org/ftp/Meetings%5F3GPP%5FSYNC/RAN1/Docs/R1%2D1906462%2Ezip. [retrieved on May 13, 2019], figure 4 Section 2.1.

* cited by examiner

SIDELINK PRIMARY AND SECONDARY SYNCHRONIZATION SIGNAL TRANSMISSION

CROSS REFERENCE TO RELATED APPLICATION(S)

This application claims the benefit of U.S. Provisional Application Ser. No. 62/860,699, entitled "SIDELINK PRIMARY AND SECONDARY SYNCHRONIZATION SIGNAL TRANSMISSION" and filed on Jun. 12, 2019, which is expressly incorporated by reference herein in its entirety.

BACKGROUND

The present disclosure relates generally to communication systems, and more particularly, to synchronization in device-to-device (D2D) communication devices, vehicle-based communication devices, and/or the like.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In such systems, the synchronization mechanism (e.g., timing and/or frequency synchronization) for a user equipment (UE) may be based on a connection to a global navigation satellite system (GNSS) or a cellular base station. Alternatively, in absence of a connection with a GNSS or base station, the synchronization for a UE may require sidelink synchronization with another UE that is already synchronized to a GNSS or base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In aspects of the disclosure, methods, computer-readable mediums, and apparatuses are provided.

In an aspect, a method of wireless communication includes configuring, by a user equipment (UE), a gap symbol as a last symbol of a sidelink synchronization signal block (S-SSB); configuring, by the UE, at least one symbol of a sidelink secondary synchronization signal (S-SSS) prior and adjacent to the gap symbol; and transmitting, by the UE, the S-SSB.

In another aspect, an apparatus includes a transceiver; a memory configured to store instructions; and one or more processors communicatively coupled with the transceiver and the memory. The one or more processors are configured to execute the instructions to perform wireless communication including configuring, by a UE, a gap symbol as a last symbol of a S-SSB; configuring, by the UE, at least one symbol of a S-SSS prior and adjacent to the gap symbol; and transmitting, by the UE, the S-SSB.

In a further aspect, an apparatus for wireless communication includes means for configuring, by a UE, a gap symbol as a last symbol of a S-SSB; means for configuring, by the UE, at least one symbol of a S-SSS prior and adjacent to the gap symbol; and means for transmitting, by the UE, the S-SSB.

In yet another aspect, a computer-readable medium includes code executable by one or more processors to perform wireless communication including configuring, by a UE, a gap symbol as a last symbol of a S-SSB; configuring, by the UE, at least one symbol of a S-SSS prior and adjacent to the gap symbol; and transmitting, by the UE, the S-SSB.

In a further aspect, a method of wireless communication includes configuring, by a UE, a symbol of a physical sidelink broadcast channel (PSBCH) as a first symbol of a S-SSB; configuring, by the UE, at least one symbol of a S-SSS following the symbol of the PSBCH; and transmitting, by the UE, the S-SSB.

In another aspect, an apparatus includes a transceiver; a memory configured to store instructions; and one or more processors communicatively coupled with the transceiver and the memory. The one or more processors are configured to execute the instructions to perform wireless communication including configuring, by a UE, a symbol of a PSBCH as a first symbol of a S-SSB; configuring, by the UE, at least one symbol of a S-SSS following the symbol of the PSBCH; and transmitting, by the UE, the S-SSB.

In a further aspect, an apparatus for wireless communication includes means for configuring, by a UE, a symbol of a PSBCH as a first symbol of a S-SSB; means for configuring, by the UE, at least one symbol of a S-SSS following the symbol of the PSBCH; and means for transmitting, by the UE, the S-SSB.

In yet another aspect, a computer-readable medium includes code executable by one or more processors to perform wireless communication including configuring, by a UE, a symbol of a PSBCH as a first symbol of a S-SSB; configuring, by the UE, at least one symbol of a S-SSS following the symbol of the PSBCH; and transmitting, by the UE, the S-SSB.

In a further aspect, a method of wireless communication includes selecting, by a UE, at least one symbol of a sidelink primary synchronization signal block (S-PSS) associated with a first maximum power reduction (MPR); selecting, by the UE, at least one symbol of a S-SSS associated with a second MPR; configuring a S-SSB including the at least one symbol of the S-SSS and the at least one symbol of the S-PSS; and transmitting, by the UE, all symbols of the S-SSB with a third MPR that is equal to an upper bound of the first MPR and the second MPR.

In another aspect, an apparatus includes a transceiver; a memory configured to store instructions; and one or more processors communicatively coupled with the transceiver and the memory. The one or more processors are configured to execute the instructions to perform wireless communication including selecting, by a UE, at least one symbol of a S-PSS associated with a first MPR; selecting, by the UE, at least one symbol of a S-SSS associated with a second MPR; configuring a S-SSB including the at least one symbol of the S-SSS and the at least one symbol of the S-PSS; and transmitting, by the UE, all symbols of the S-SSB with a third MPR that is equal to an upper bound of the first MPR and the second MPR.

In a further aspect, an apparatus for wireless communication includes means for selecting, by a UE, at least one symbol of a S-PSS associated with a first MPR; means for selecting, by the UE, at least one symbol of a S-SSS associated with a second MPR; means for configuring a S-SSB including the at least one symbol of the S-SSS and the at least one symbol of the S-PSS; and means for transmitting, by the UE, all symbols of the S-SSB with a third MPR that is equal to an upper bound of the first MPR and the second MPR.

In yet another aspect, a computer-readable medium includes code executable by one or more processors to perform wireless communication including selecting, by a UE, at least one symbol of a S-PSS associated with a first MPR; selecting, by the UE, at least one symbol of a S-SSS associated with a second MPR; configuring a S-SSB including the at least one symbol of the S-SSS and the at least one symbol of the S-PSS; and transmitting, by the UE, all symbols of the S-SSB with a third MPR that is equal to an upper bound of the first MPR and the second MPR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
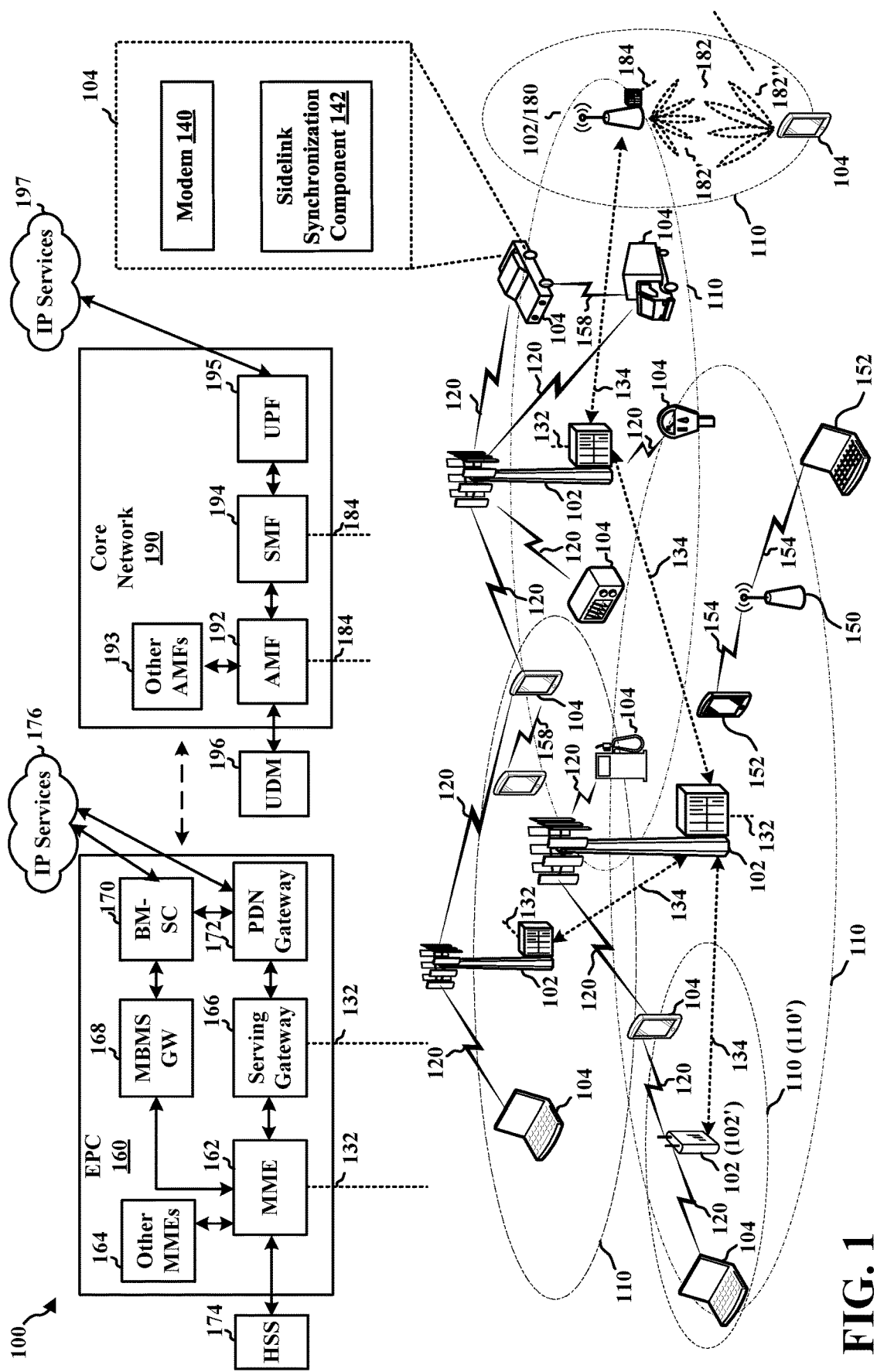
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

The present aspects generally relate to efficiently communicating sidelink synchronization signal blocks (S-SSBs) including sidelink primary synchronization signal (S-PSSS) symbols and sidelink secondary synchronization signal (S-SSS) symbols.

An S-SSB for communication over a sidelink channel in fifth generation (5G) new radio (NR) vehicle-to-anything (V2X) may include S-PSS and S-SSS symbols with different peak-to-average power ratio (PAPR), leading to different maximum power reduction (MPR) values associated with and used for transmission/reception of such symbols. This may result in a transient period where a transmission power changes and a transmitting and/or receiving user equipment (UE) needs to perform automatic gain control (AGC) to adapt, thereby adversely affecting spectral efficiency and performance.

However, some present aspects provide S-SSBs that minimize the impact of the transient period, while some other aspects remove or at least substantially reduce/mitigate the need for a transient period without compromising performance.

Generally, D2D communication may include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to a network node such as a base station), a combination thereof, and/or with other devices, which may be collectively referred to as V2X communications. Generally, support for synchronization using SSBs within synchronization signal bursts is provided in 5G NR communication technologies over the Uu interface (e.g., from a gNodeB (gNB) to a user equipment (UE)), for example, as described below with reference to FIGS. 2A-2D. Similar synchronization as described below with reference to FIGS. 2A-2D may also be implemented in V2X communication over a sidelink channel. For example, in V2X or other D2D communications, a UE that has received a synchronization signal from a gNB or global navigation satellite system (GNSS) may transmit a sidelink synchronization signal that is consistent with the gNB or GNSS timing and/or frequency, so that other UEs that are out of range of the gNB and/or GNSS may also be able to synchronize to such timing and/or frequency. Further, a UE that has received no synchronization signal from a gNB or GNSS may also transmit a sidelink synchronization signal to synchronize with other UEs and send data to other UEs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including UEs 104 that may communicate with each other over a sidelink channel of a device-to-device (D2D) communication link 158. In an aspect, for example, a UE 104 may include a modem 140 and a sidelink synchronization component 142 for transmitting sidelink synchronization signals on a number of resources, so that other UEs 104 may synchronize timing and/or frequency based on reference signals received in data packets over the sidelink channel. In an aspect, UE 104 may transmit an S-SSB including an S-SSS symbol configured adjacent to a gap (a period with no transmission), thereby "hiding" a corresponding transient period into the gap. In an aspect, UE 104 may transmit an S-SSB including an S-SSS symbol configured after a first PSBCH symbol configured to tolerate being punctured. In an aspect, UE 104 may transmit an S-SSB including S-PSS and S-SSS symbols with substantially similar associated MPR values, thus obviating or at least substantially reducing the need for a transient period and improving spectral efficiency and performance. In an aspect, the S-SSB may include S-PSS and S-SSS symbols associated with different MPR values (due to different PAPR), and UE 104 may transmit the S-SSB (including the S-PSS and S-SSS symbols) at an upper bound of such associated MPR values, thus obviating or at least substantially reducing the need for a transient period and improving spectral efficiency and performance. In the aforementioned aspect, the UE may configure additional symbols for those components of S-SSB that have an associated MPR that is lower than the upper bound MPR used for the entire S-SSB. Further details of the present aspects are described below.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMEs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
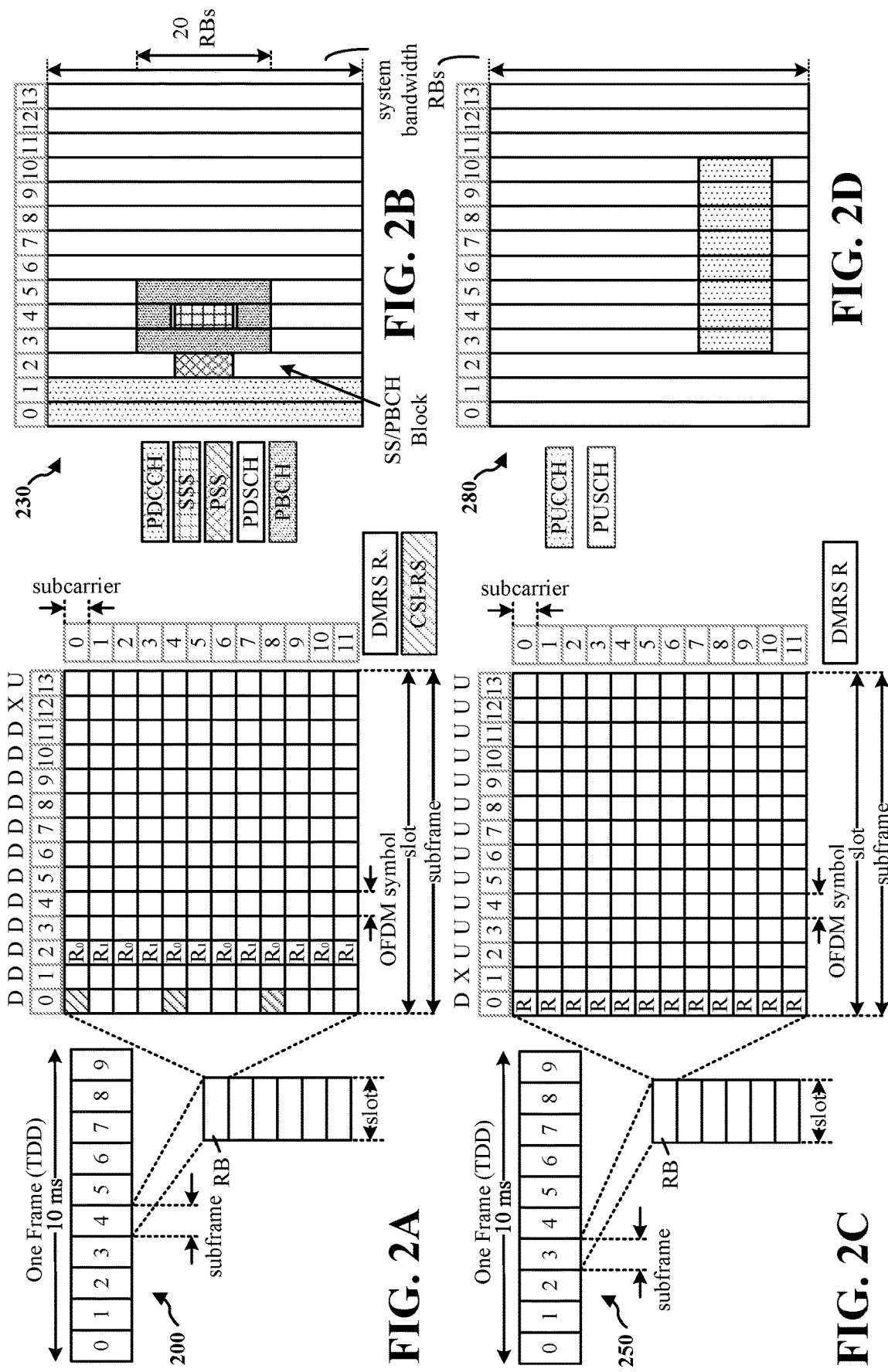
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

Referring to FIGS. 2A-2D, one or more example frame structures, channels, and resources may be used for communication between the base stations 102 and UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

FIGS. 3-8 are diagrams illustrating example S-SSBs 300, 400, 500, 600, 700, 800 that may be transmitted by UE 104. In an aspect, transmission of each of the S-SSBs 300, 400, 500, 600, 700, 800 may be similar to transmission of a downlink SSB by a base station 102 according to 3GPP 5G NR standards. Each of S-SSBs 300, 400, 500, 600, 700, 800 may include physical sidelink broadcast channel (PSBCH), S-PSS, and S-SSS. PSBCH may provide information about the frame structure, etc. S-PSS may be selected from a number of defined sequences (e.g., 2 sequences), and may be used primarily for obtaining timing information and carrier frequency offset (CFO) estimation. S-SSS may be selected from a number of defined sequences (e.g., 168 sequences), and may be used for resolving residual CFO. Together, S-PSS and S-SSS may indicate a sidelink synchronization signal identity (SLSSID).

Figure 3:
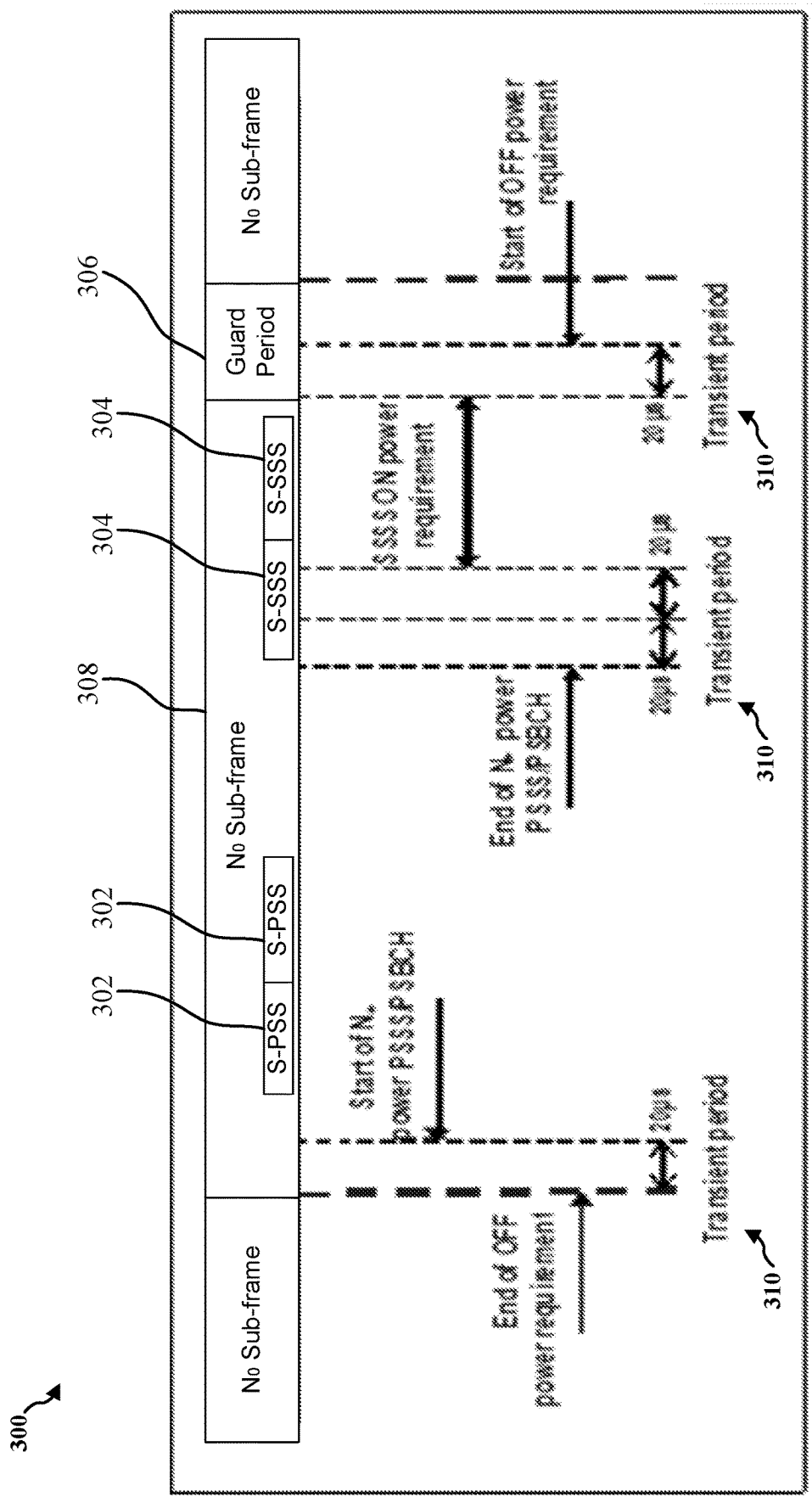
FIGS. 3-8 are diagrams illustrating example sidelink synchronization signal blocks (S-SSBs)

Referring first to FIG. 3, an example subframe 308 of a first S-SSB 300 for normal cyclic prefix (CP) in LTE V2X includes two symbols of S-PSS 302 and two symbols of S-SSS 304. The first S-SSB 300 further includes transient periods 310 before and after S-SSS 304, due to the S-SSS sequences which are associated with higher MPR for S-SSS 304 as compared to other components of the first S-SSB 300. The MPR value is the amount of power reduction at the output of the power amplifier, and is a function of the PAPR of a symbol/sequence. The transition from one MPR to a different MPR (e.g., from an MPR used for S-PSS 302 to another MPR used for another component of S-SSB 300) requires some transient period 310 (e.g., 30 microseconds) for the transmitter to adapt to the change in power. More specifically, for example, in an aspect, the S-PSS sequence may be chosen from two sequences that have very good correlation properties and have equal amplitude sequences, while the S-SSS sequences may be chosen from a much larger number of sequences (e.g., 168) such as Gold sequences that have very good cross-correlation properties such that one S-SSS sequence may be distinguished from another. However, as compared to S-PSS, the large number of S-SSS sequences may not always have equal amplitude, thus leading to high PAPR and therefore high associated MPR.

In an aspect, although S-PSS 302 has a lower associated MPR than S-SSS 304, a transmitter may apply the larger MPR to the entire frame to avoid or at least reduce transient periods, but such reduction in power also reduces resultant SNR for the S-PSS sequence detection, thus adversely affecting synchronization performance and coverage as a whole.

Figure 4:
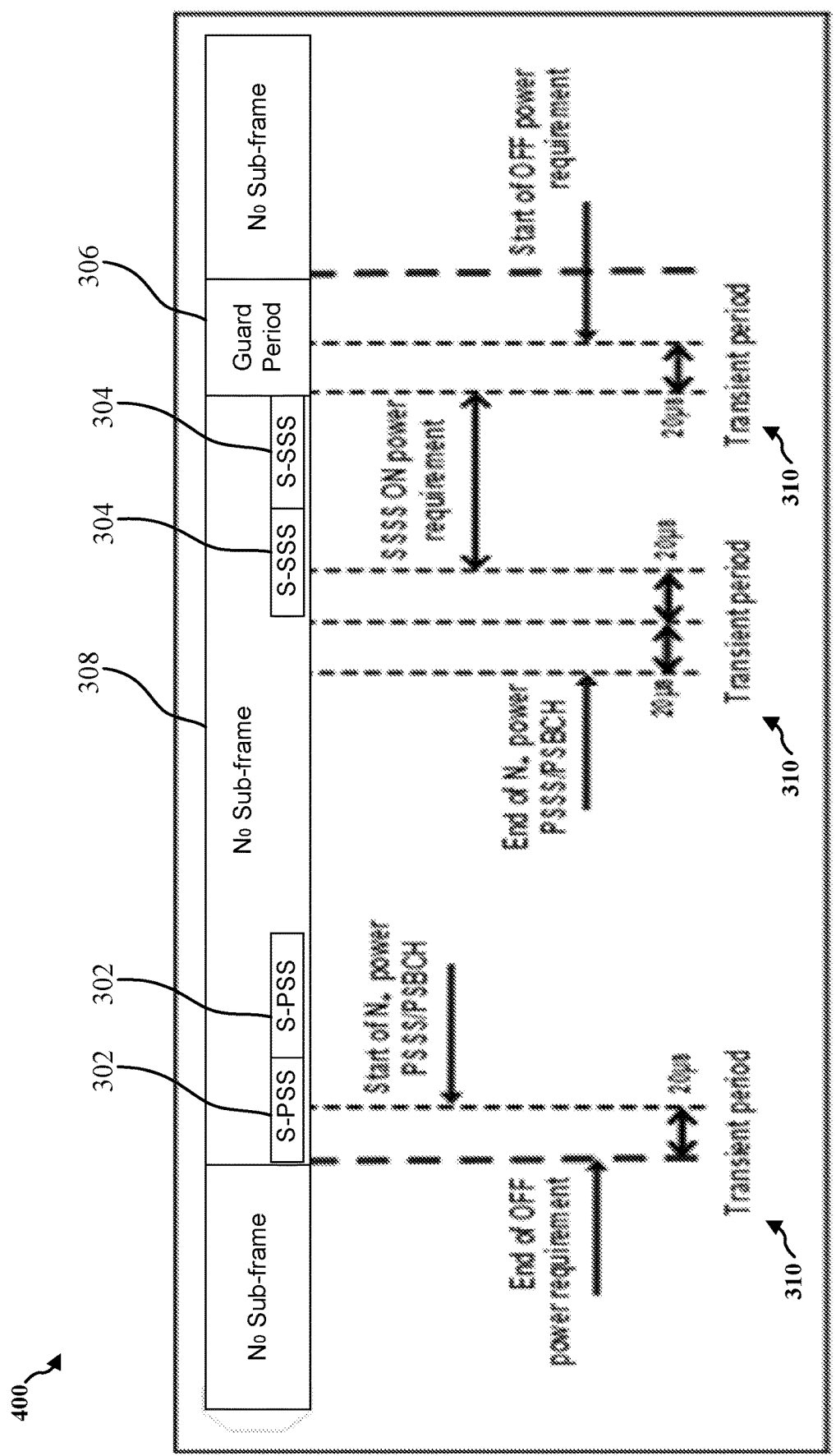

Referring next to FIG. 4, the subframe 308 of a second S-SSB 400 for extended CP in LTE V2X includes two symbols of S-PSS 302 and two symbols of S-SSS 304. The second S-SSB 400 further includes transient periods 310 before and after the S-SSS 304, due to the S-SSS sequences used for S-SSS 304 having higher MPR as compared to other components of the second S-SSB 400.

Figure 5:
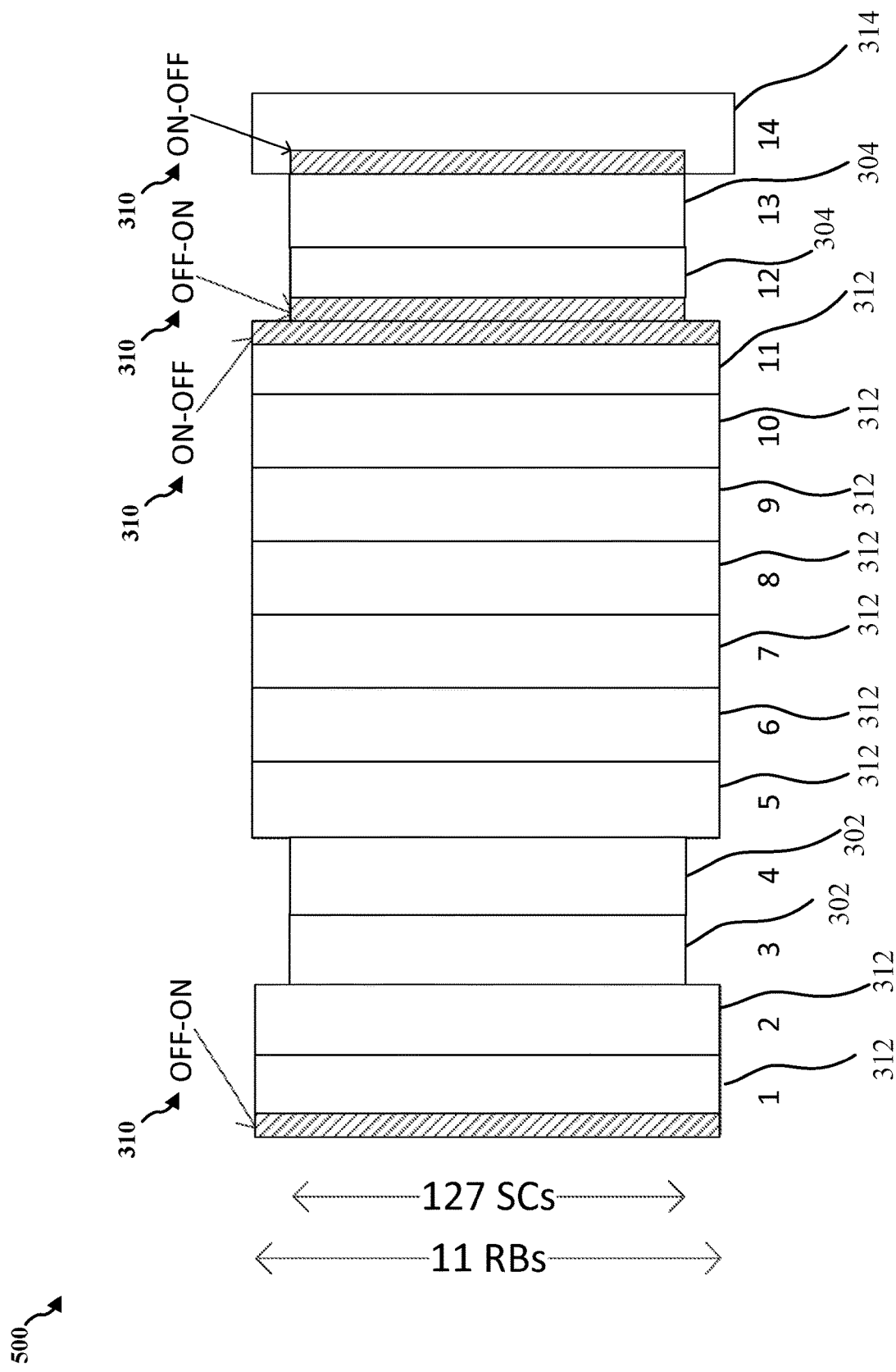

Similar to LTE V2X, the S-SSS sequences in NR V2X may be associated with higher MPRs than S-PSS sequences in some cases. FIG. 5 is a diagram illustrating an example of a third S-SSB 500 for NR V2X using the MPR values derived based on the S-SSS sequences themselves. The third S-SSB 500 includes two symbols of PSBCH 312, followed by two symbols of S-PSS 302, followed by seven symbols of PSBCH 312, followed by two symbols of S-SSS 304, followed by a gap symbol 314. Due to the high MPR associated with and used for S-SSS 304, transient periods 310 are needed between neighboring S-SSS 304 and PSBCH 312, but at least some of the transient periods 310 are hidden as much as possible into the gap symbol 314 (a symbol with no transmission) so as to not affect PSBCH 312. That is, at least a portion of the transient periods 310 is not observed (hidden) since they at least partially coincide/overlap with a time period with no transmission (gap). However, the further apart the S-PSS 302 and S-SSS 304 are configured, the weaker is the channel estimation for S-SSS 304 based on S-PSS 302. In an aspect, for example, the distance between S-PSS 302 and S-SSS 304 may cause S-PSS to S-SSS channel variation, resulting in high Doppler impact if coherent detection is used for S-SSS detection.

Figure 6:
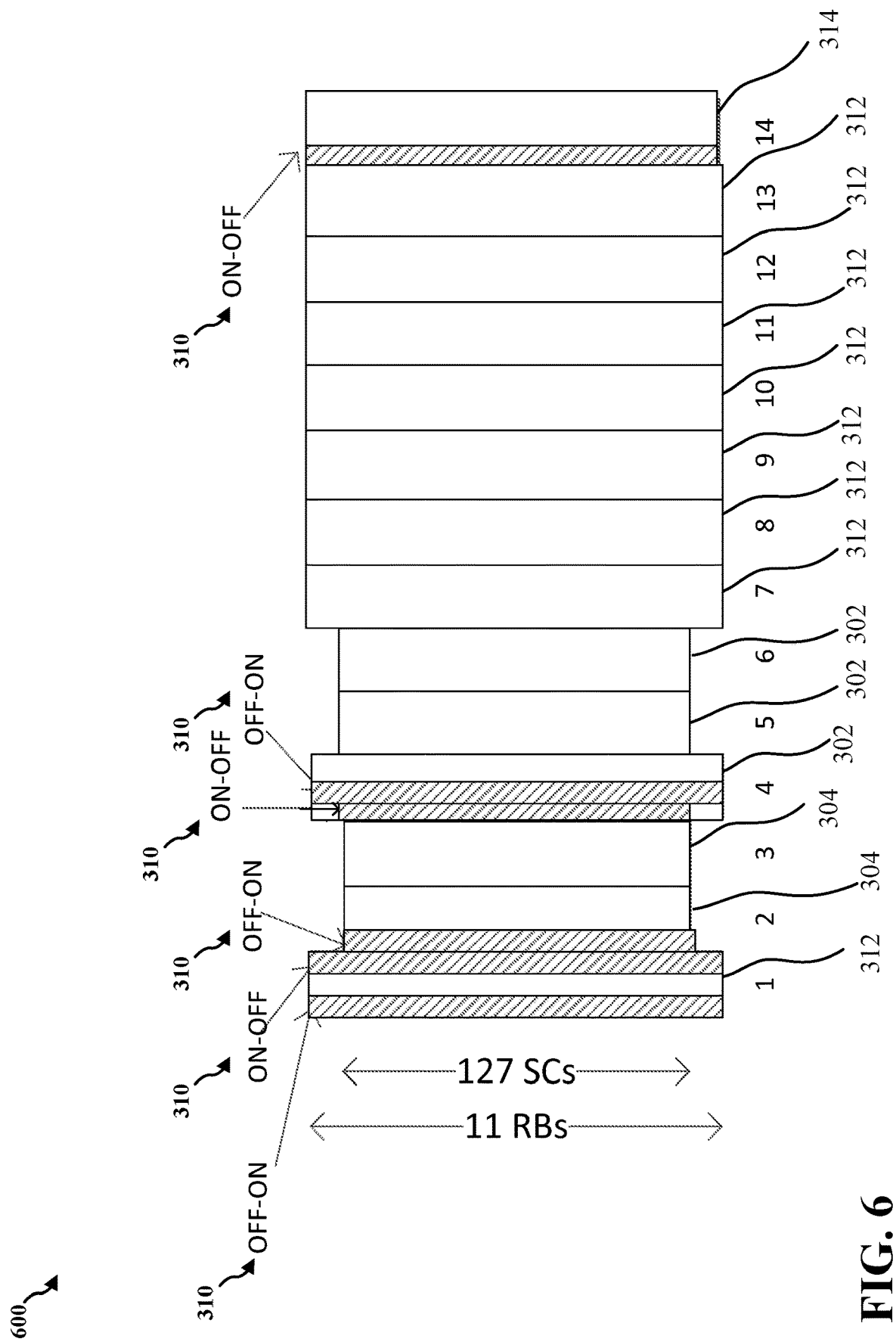
Figure 7:
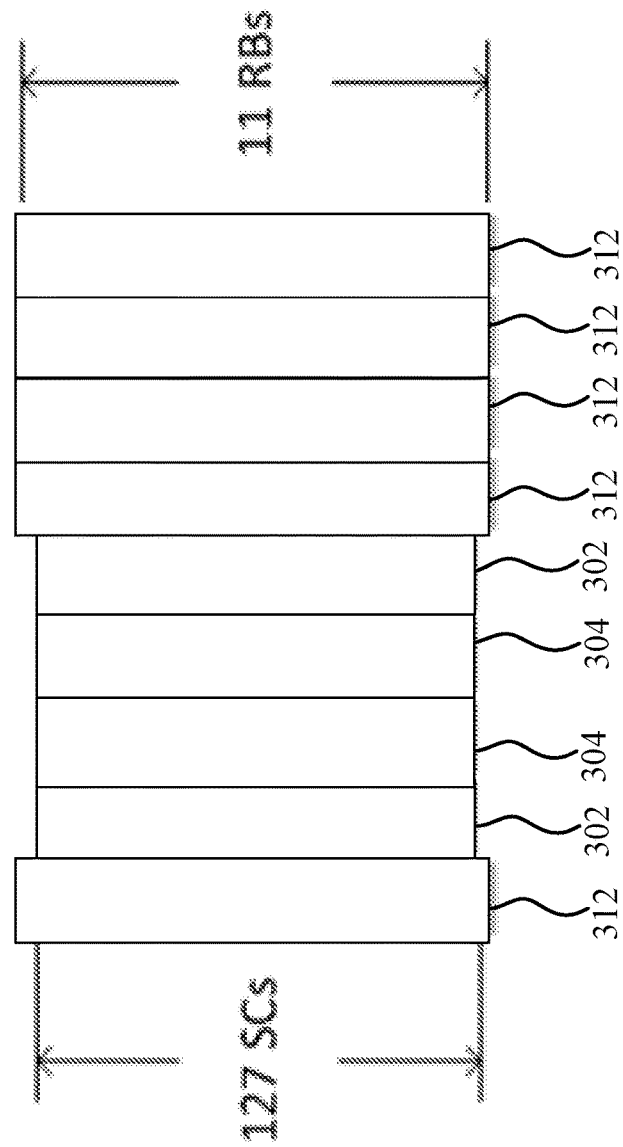

FIG. 6 is a diagram illustrating an example of a fourth S-SSB 600 for NR V2X, again using the MPR values derived based on the S-SSS sequences themselves. The fourth S-SSB 600 includes one symbol of PSBCH 312, followed by two symbols of S-SSS 304, followed by one symbol of PSBCH 312, followed by two symbols of S-SSS 304, followed by seven symbols of PSBCH 312, followed by a gap symbol 314. In an alternative aspect, the location of the two symbols of S-SSS 304 and the two symbols of S-SSS 304 may be switched. As compared to the third S-SSB 500, the fourth S-SSB 600 provides good performance by configuring only one symbol of PSBCH 312 between S-PSS 302 and S-SSS 304 (less channel variation), but has more transient periods 310 impacting PSBCH 312 which may cause performance issues for PSBCH 312.

In some alternative aspects, NR V2X S-SSB transmissions may be configured to reduce/mitigate transient periods, for example, by selecting the same MPR for the entire S-SSB. For example, referring to FIG. 7, a fifth S-SSB 700 for NR V2X may implement S-PSS 302 and S-SSS 304 with substantially the same MPR values (e.g., within 10%) and may thus eliminate or at least substantially reduce transient periods. More specifically, the fifth S-SSB 700 may include one symbol of PSBCH 312, followed by one symbol of S-SSS 304, followed by two symbols of S-PSS 302, followed by one symbol of S-SSS 304, followed by multiple symbols of PSBCH 312.

Figure 8:
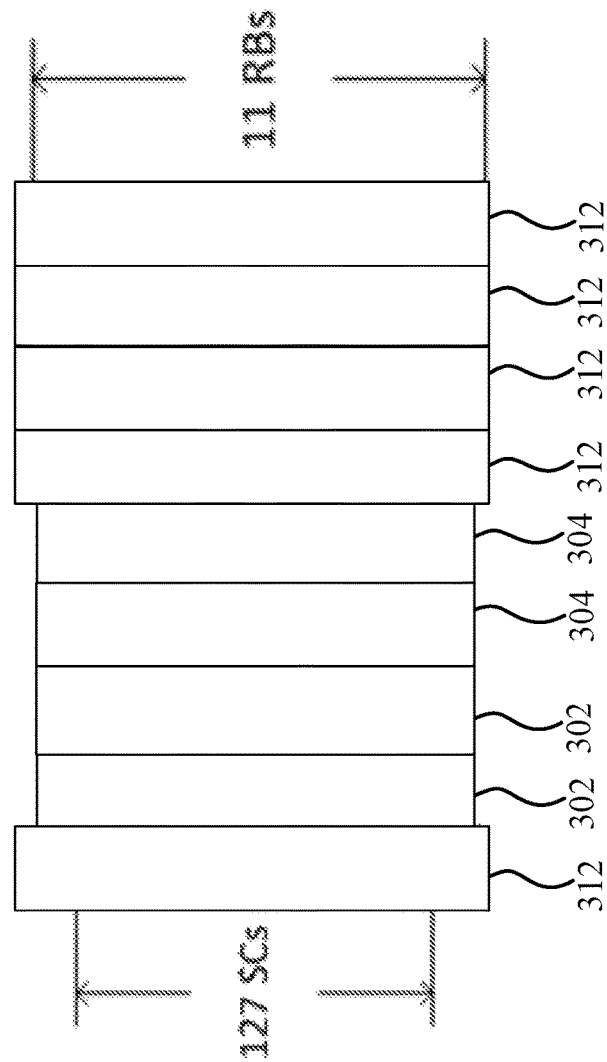

Alternatively, as another example, referring to FIG. 8, a sixth S-SSB 800 for NR V2X may implement S-PSS 302 and S-SSS 304 with substantially the same MPR values and may thus reduce/mitigate transient periods. More specifically, the sixth S-SSB 800 may include one symbol of PSBCH 312, followed by two symbols of S-PSS 302, followed by two symbols of S-SSS 304, followed by multiple symbols of PSBCH 312. In an aspect, as compared to the sixth S-SSB 800, the fifth S-SSB 700 may have better CFO detection performance due to separating the two symbols of S-SSS 304. More specifically, very good channel estimation may be achieved by detecting the S-PSS 302 and then using that to detect the S-SSS 304 which are next to the S-PSS 302. Further, such configuration may result in more accurate determination of the residual CFO.

On the other hand, in some rare aspects, the rotation between the two separated symbols of S-SSS 304 in the fifth S-SSB 700 may be so high (e.g., 2π) that the two separated symbols of S-SSS 304 look the same, thus not allowing for CFO determination. In this case, the sixth S-SSB 800 may be advantageous over the fifth S-SSB 700 for CFO determination.

In both the fifth S-SSB 700 and the sixth S-SSB 800, one symbol of PSBCH 312 is configured as the first symbol in order to allow for automatic gain control (AGC). Generally, AGC is required for every frame to adapt to the range of the signal. At the beginning of each frame, if the gain state has not changed since the previous frame, then the first symbol of the new frame can be received. However, if the gain state has changed since the previous frame, the gain state needs to be adjusted by performing AGC. As such, the first symbol of a frame may be opportunistically/occasionally punctured or not punctured depending on whether the gain state has changed or not. However, the first symbol in the fifth S-SSB 700 and the sixth S-SSB 800 is a PSBCH 312, and the coding of the PSBCH 312 may be selected such that PSBCH 312 may be decoded accurately even if the first symbol is punctured. For example, in an aspect, the code rate of PSBCH 312 may be set low to avoid missing data even if the first symbol is punctured. That is, PSBCH 312 may be configured to afford to have one or more symbols punctured. However, such configuration is not possible for S-PSS 302 or S-SSS 304 which are sequences, unlike PSBCH 312 which carries data.

In one non-limiting aspect, for example, an S-SSB for NR V2X may be configured to use the same MPR for the entire S-SSB by re-designing and selecting from a new set of S-SSS sequences that are associated with similar MPR as the S-PSS sequences. For example, in an aspect, instead of Gold sequences, M-sequences may be used for S-SSS.

In another non-limiting aspect, for example, the MPR associated with an S-SSS may vary based on the respective S-SSS identifier (ID), and a subset of S-SSS sequences with very low MPR (comparable to S-PSS) may be used for configuring V2X S-SSBs. For example, in an aspect, S-SSBs for NR V2X may be configured such that the S-SSS IDs with relatively low MPR sequences are used most of the time (e.g., when UEs have coverage by a gNB or GNSS).

More specifically, there are two possible S-PSS sequences: a first sequence for indicating that a UE is in a coverage area of a gNB, and a second sequence for indicating that a UE is out of coverage with no connection to a gNB. However, many more S-SSS sequences (e.g., 168, 336, or 672 S-SSS sequences) are used to allow for autonomous timing in V2X. In an aspect, for example, a number of UEs with no connection to a gNB or GNSS (e.g., vehicles traveling in an underground tunnel) may still synchronize to an autonomous/independent timing to enable V2X communication among each other. In an aspect, S-SSS IDs 0, 1, 2, 168, 169 are sequences selected for their low MPR properties, while other S-SSS IDs (3~167 and IDs above 169) are regular S-SSS sequences associated with high MPR. As such, in an aspect, special S-SSS IDs including 0, 1, and 2 are used to distinguish gNB timing, GNSS timing, and all timings derived from gNB or GNSS timing, while other S-SSS IDs (e.g., 3-168) are randomly selected by the UEs for synchronization in autonomous timing. As a result, most S-SSB transmissions include a small number of common S-SSS IDs associated with low MPR, while S-SSB transmissions with uncommon S-SSS IDs associated with high MPR are used for UEs with autonomous timing. That is, S-SSS IDs 0, 1, and 2 that are used more often are assigned to S-SSS sequences associated with lower MPR (e.g., use MPR similar to S-PSS sequences), while other S-SSS sequences associated with higher MPR are assigned to other S-SSS IDs (e.g., 3~167 and 169+). In an aspect, the MPR for an entire V2X S-SSB is selected based on the S-SSS ID in the S-SSB. Specifically, a low MPR is selected for the entire S-SSB when S-SSS IDs are associated with low MPR (e.g., for S-SSS IDs 0, 1, 2, 168, 169) and a high MPR is selected for the entire S-SSB when S-SSS IDs are associated with high MPR. Therefore, since there is no change in MPR during the entire S-SSB transmission, there are no transient periods in the S-SSB.

In an aspect, in autonomous driving, using a high MPR for the entire S-SSB (including S-SSS and PSBCH symbols) may reduce coverage. However, coverage impact in autonomous timing (i.e., not associated with either the gNB/eNB or GNSS timing) is not a significant design criterion as compared to removing the transient periods.

In one non-limiting alternative and/or additional aspect, for example, an extra S-PSS symbol may be added between the S-PSS and S-SSS symbols to compensate for S-PSS power reduction. For example, referring back to FIG. 8 where the S-SSB 800 includes two symbols of S-PSS 302 and two symbols of S-SSS 304, the high MPR associated with the S-SSS 302 may be used for the entire S-SSB 800, causing power reduction on the S-PSS 302 and loss of coverage. However, adding a third symbol of S-PSS 302 before the two symbols of S-SSS 304 may provide a signal to noise ratio (SNR) gain to make up for such power reduction and loss of coverage. For example, the S-PSS detection probability may be boosted by 3 dB due to the extra S-PSS symbol, and loss of coverage due to MPR reduction is compensated by the additional S-PSS symbol.

In a further non-limiting alternative and/or additional aspect, when the same MPR is used for S-PSS, S-SSS, and PSBCH, additional symbols of PSBCH may be used to ensure no coverage impact to PSBCH. Alternatively and/or additionally, PSBCH code rate may be adjusted to improve/maintain coverage when the same MPR is used for PSBCH and S-SSS.

Accordingly, since the same MPR is used for the entire S-SSB, transient periods are reduced/mitigated in S-SSB, while coverage for S-SSB is not compromised.

In a further non-limiting alternative and/or additional aspect, for example, instead of or in addition to including additional S-PSS, other symbols may be added, e.g., demodulation reference signal (DMRS) sequence of PSBCH, or PSBCH symbols. For example, referring back to FIG. 8, a DMRS or PSBCH symbol may be placed before and/or after S-SSS where a transient period is expected, so that the additional symbol is punctured if needed.

Figure 9:
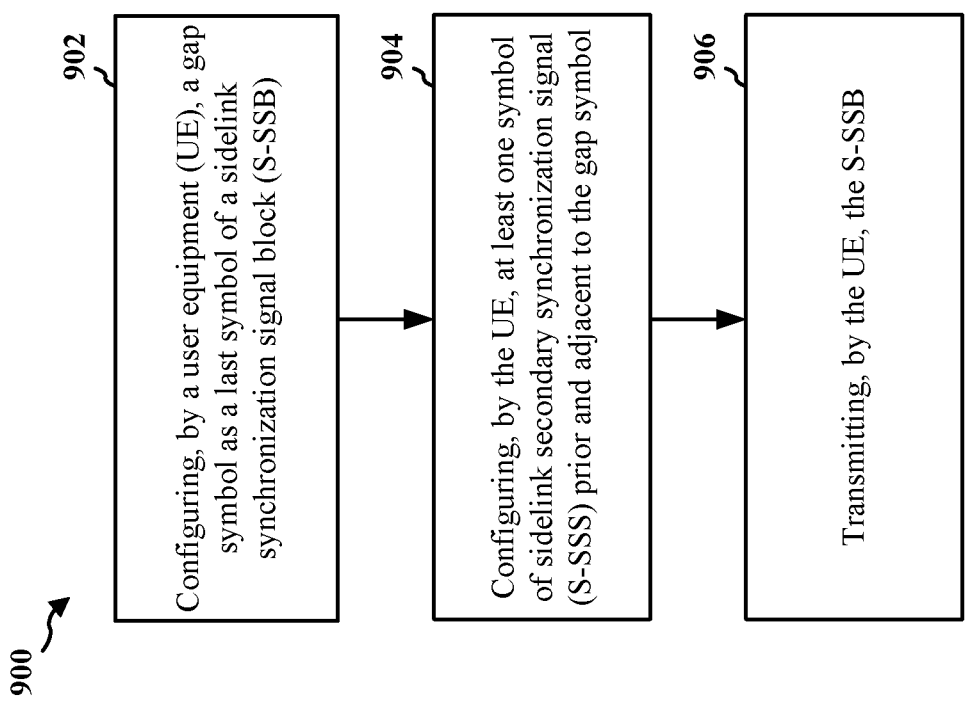
FIGS. 9-11 are flow charts illustrating example methods for transmitting an S-SSB, in accordance with various aspects of the present disclosure.
Figure 10:
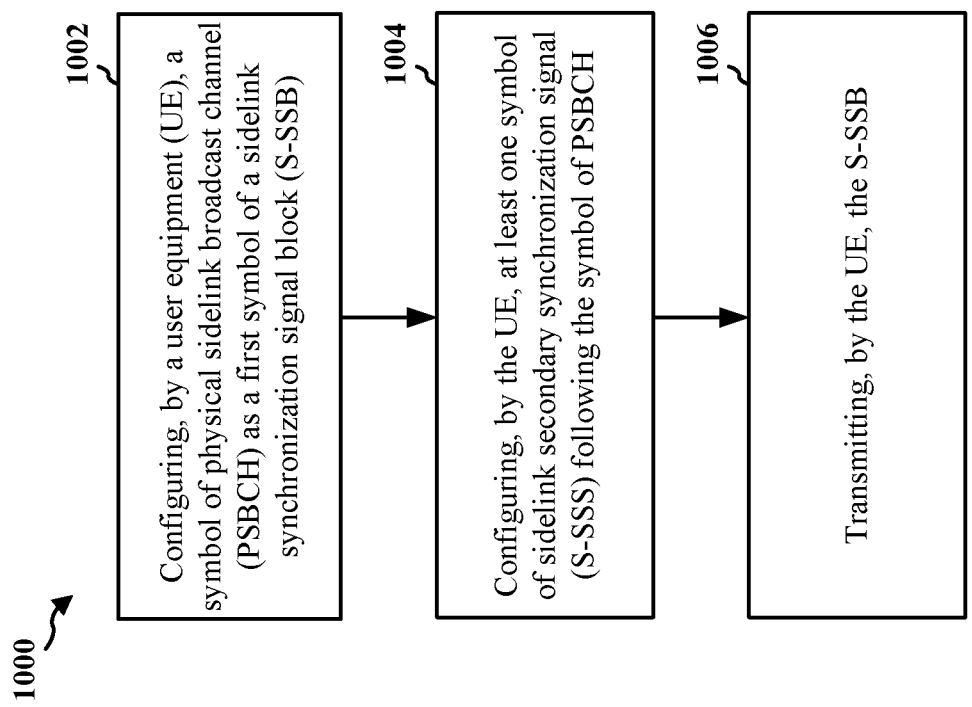
Figure 11:
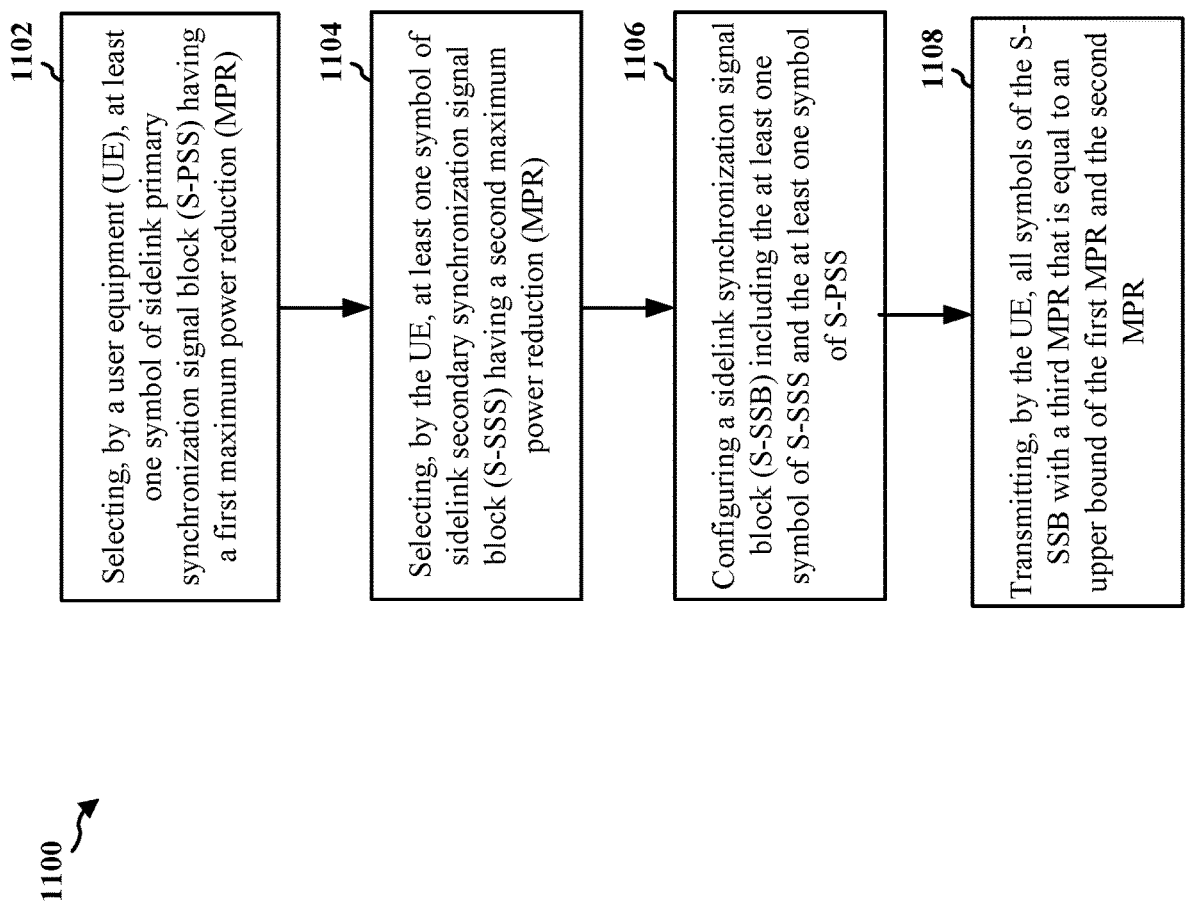

FIGS. 9-11 illustrate flow charts of example methods 900, 1000, 1100 for transmitting an S-SSB for wireless communications. In an example, UE 104 may perform the functions described in any of methods 900, 1000, 1100 using one or more of the components described in FIG. 1 above (e.g., modem 140 and/or sidelink synchronization component 142 of UE 104 in FIG. 1) or in FIG. 12 or 13 below (e.g., antenna 265, RF front end 288, transceiver 202, modem 140, processor 212, memory 216, and/or sidelink synchronization component 142 of UE 104 in FIG. 12, and/or antennas 1352, transmitter 1354TX, receiver 1354RX, TX processor 1368, RX processor 1356, memory 1360, and/or controller/processor 1359 of UE 1350 in FIG. 13).

Referring to FIG. 9, at 902 method 900 includes configuring, by a UE, a gap symbol as a last symbol of a S-SSB. For example, in an aspect, UE 104, modem 140, sidelink synchronization component 142, antenna 265, RF front end 288, transceiver 202, and/or processor 212 may configure a gap symbol as a last symbol of a S-SSB. Accordingly, in an aspect, UE 104, modem 140, sidelink synchronization component 142, antenna 265, RF front end 288, transceiver 202, and/or processor 212 may provide means for configuring, by a UE, a gap symbol as a last symbol of a S-SSB.

At 904, method 900 includes configuring, by the UE, at least one symbol of a S-SSS prior and adjacent to the gap symbol. For example, in an aspect, UE 104, modem 140, sidelink synchronization component 142, antenna 265, RF front end 288, transceiver 202, and/or processor 212 may configure at least one symbol of a S-SSS prior and adjacent to the gap symbol. Accordingly, in an aspect, UE 104, modem 140, sidelink synchronization component 142, antenna 265, RF front end 288, transceiver 202, and/or processor 212 may provide means for configuring, by the UE, at least one symbol of a S-SSS prior and adjacent to the gap symbol.

At 906, method 900 includes transmitting, by the UE, the S-SSB. For example, in an aspect, UE 104, modem 140, sidelink synchronization component 142, antenna 265, RF front end 288, transceiver 202, and/or processor 212 may transmit the S-SSB. Accordingly, in an aspect, UE 104, modem 140, sidelink synchronization component 142, antenna 265, RF front end 288, transceiver 202, and/or processor 212 may provide means for transmitting, by the UE, the S-SSB.

Referring to FIG. 10, at 1002, method 1000 includes configuring, by a UE, a symbol of a PSBCH as a first symbol of a S-SSB. For example, in an aspect, UE 104, modem 140, sidelink synchronization component 142, antenna 265, RF front end 288, transceiver 202, and/or processor 212 may configure a symbol of a PSBCH as a first symbol of a S-SSB. Accordingly, in an aspect, UE 104, modem 140, sidelink synchronization component 142, antenna 265, RF front end 288, transceiver 202, and/or processor 212 may provide means for configuring, by a UE, a symbol of a PSBCH as a first symbol of a S-SSB.

At 1004, method 1000 includes configuring, by the UE, at least one symbol of a S-SSS following the symbol of the PSBCH. For example, in an aspect, UE 104, modem 140, sidelink synchronization component 142, antenna 265, RF front end 288, transceiver 202, and/or processor 212 may configure at least one symbol of a S-SSS following the symbol of the PSBCH. Accordingly, in an aspect, UE 104, modem 140, sidelink synchronization component 142, antenna 265, RF front end 288, transceiver 202, and/or processor 212 may provide means for configuring, by the UE, at least one symbol of a S-SSS following the symbol of the PSBCH.

At 1006, method 1000 includes transmitting, by the UE, the S-SSB. For example, in an aspect, UE 104, modem 140, sidelink synchronization component 142, antenna 265, RF front end 288, transceiver 202, and/or processor 212 may transmit the S-SSB. Accordingly, in an aspect, UE 104, modem 140, sidelink synchronization component 142, antenna 265, RF front end 288, transceiver 202, and/or processor 212 may provide means for transmitting, by the UE, the S-SSB.

Referring to FIG. 11, at 1102, method 1100 includes selecting, by a UE, at least one symbol of a S-PSS associated with a first MPR. For example, in an aspect, UE 104, modem 140, sidelink synchronization component 142, antenna 265, RF front end 288, transceiver 202, and/or processor 212 may select at least one symbol of a S-PSS associated with a first MPR. Accordingly, in an aspect, UE 104, modem 140, sidelink synchronization component 142, antenna 265, RF front end 288, transceiver 202, and/or processor 212 may provide means for selecting, by a UE, at least one symbol of a S-PSS associated with a first MPR.

At 1104, method 1100 includes selecting, by the UE, at least one symbol of a S-SSS associated with a second MPR. For example, in an aspect, UE 104, modem 140, sidelink synchronization component 142, antenna 265, RF front end 288, transceiver 202, and/or processor 212 may select at least one symbol of a S-SSS associated with a second MPR. Accordingly, in an aspect, UE 104, modem 140, sidelink synchronization component 142, antenna 265, RF front end 288, transceiver 202, and/or processor 212 may provide means for selecting, by the UE, at least one symbol of a S-SSS associated with a second MPR.

At 1106, method 1100 includes configuring a S-SSB including the at least one symbol of the S-SSS and the at least one symbol of the S-PS S. For example, in an aspect, UE 104, modem 140, sidelink synchronization component 142, antenna 265, RF front end 288, transceiver 202, and/or processor 212 may configure a S-SSB including the at least one symbol of the S-SSS and the at least one symbol of the S-PSS. Accordingly, in an aspect, UE 104, modem 140, sidelink synchronization component 142, antenna 265, RF front end 288, transceiver 202, and/or processor 212 may provide means for configuring a S-SSB including the at least one symbol of the S-SSS and the at least one symbol of the S-PSS.

At 1108, method 1100 includes transmitting, by the UE, all symbols of the S-SSB with a third MPR that is equal to an upper bound of the first MPR and the second MPR. For example, in an aspect, UE 104, modem 140, sidelink synchronization component 142, antenna 265, RF front end 288, transceiver 202, and/or processor 212 may transmit all symbols of the S-SSB with a third MPR that is equal to an upper bound of the first MPR and the second MPR. Accordingly, in an aspect, UE 104, modem 140, sidelink synchronization component 142, antenna 265, RF front end 288, transceiver 202, and/or processor 212 may provide means for transmitting, by the UE, all symbols of the S-SSB with a third MPR that is equal to an upper bound of the first MPR and the second MPR.

Optionally, in an aspect, the first MPR is equal to the second MPR and equal to the third MPR.

Optionally, in an aspect, the method 1100 may further include selecting the at least one symbol of S-SSS from a set of sequences all having the third MPR. For example, in an aspect, UE 104, modem 140, sidelink synchronization component 142, antenna 265, RF front end 288, transceiver 202, and/or processor 212 may select the at least one symbol of S-SSS from a set of sequences all having the third MPR. Accordingly, in an aspect, UE 104, modem 140, sidelink synchronization component 142, antenna 265, RF front end 288, transceiver 202, and/or processor 212 may provide means for selecting the at least one symbol of S-SSS from a set of sequences all having the third MPR.

Optionally, in an aspect, the second MPR is dependent on a sequence identifier of the at least one symbol of S-SSS, and the third MPR is equal to the second MPR and greater than the first MPR.

Optionally, in an aspect, the method 1100 may further include including one or more additional symbols in the S-SSB for one or more components of the S-SSB whose MPR is less than the third MPR. For example, in an aspect, UE 104, modem 140, sidelink synchronization component 142, antenna 265, RF front end 288, transceiver 202, and/or processor 212 may include one or more additional symbols in the S-SSB for one or more components of the S-SSB whose MPR is less than the third MPR. Accordingly, in an aspect, UE 104, modem 140, sidelink synchronization component 142, antenna 265, RF front end 288, transceiver 202, and/or processor 212 may provide means for including one or more additional symbols in the S-SSB for one or more components of the S-SSB whose MPR is less than the third MPR.

Figure 12:
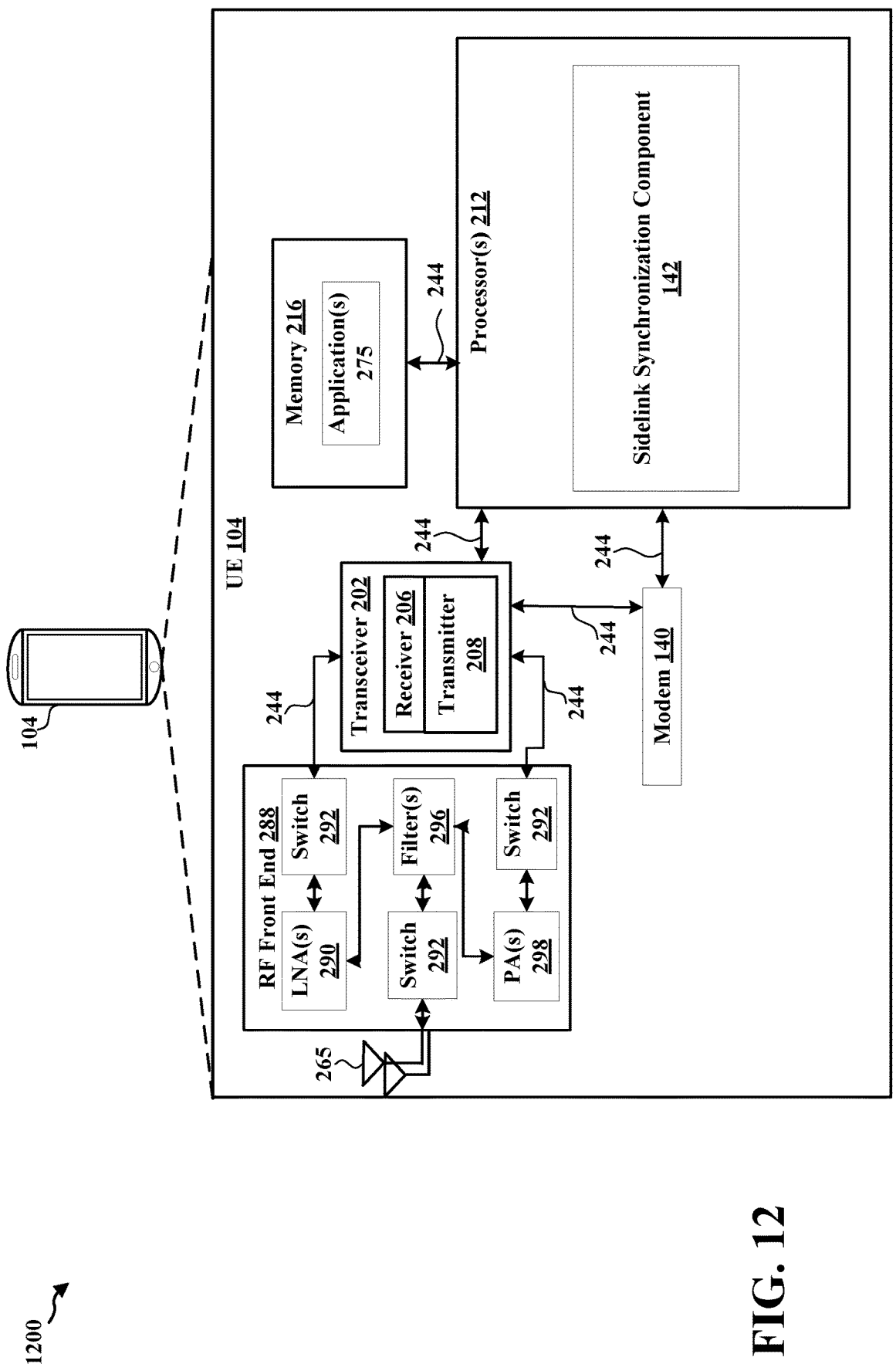
FIG. 12 is a block diagram illustrating an example of a user equipment (UE)

Referring to FIG. 12, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or sidelink synchronization component 142 to enable one or more of the functions described herein related to transmitting a sidelink synchronization signal.

In an aspect, the one or more processors 212 can include a modem 140 and/or can be part of the modem 140 that uses one or more modem processors. Thus, the various functions related to sidelink synchronization component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with sidelink synchronization component 142 may be performed by transceiver 202.

Also, memory 216 may be configured to store data used herein and/or local versions of applications 275 or sidelink synchronization component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining sidelink synchronization component 142 and/or one or more of its subcomponents, and/or data associated therewith, when UE 104 is operating at least one processor 212 to execute sidelink synchronization component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, sidelink synchronization component 142 is configured to transmit one or more sidelink synchronization signals on a variable number of resources based on a priority level, e.g., related to a source or reliability of the synchronization. The sidelink synchronization component 142 can optionally include a priority determining component 252 for determining a synchronization signal priority level to use in transmitting a sidelink synchronization signal block (S-SSB) to other UEs or other devices in a wireless network, a resource component 254 for determining a number of resources in a synchronization signal burst on which to transmit the S-SSB, and/or a transmitting component 256 for transmitting the synchronization signal to other UEs or other devices in the wireless network. Although illustrated as being associated with the processor 212, it should be understood that the functionality of the sidelink synchronization component 142 may alternatively be implemented by the modem 140.

In an aspect, the processor(s) 212 may correspond to one or more of the processors described in connection with UE 1350 in FIG. 13 below. Similarly, the memory 216 may correspond to the memory described in connection with UE 1350 in FIG. 13 below.

In one configuration, UE 104 or UE 1350 may be an apparatus for wireless communication including means for performing any of the appended claims. The aforementioned means may be one or more of the aforementioned components of UE 104 and/or processor 212 of UE 104 configured to perform the functions recited by the aforementioned means. As described supra, processor 212 may include the TX Processor 1368, the RX Processor 1356, and the controller/processor 1359 of UE 1350 described below with reference to FIG. 13. As such, in one configuration, the aforementioned means may be the TX Processor 1368, the RX Processor 1356, and the controller/processor 1359 configured to perform the functions recited by the aforementioned means.

Figure 13:
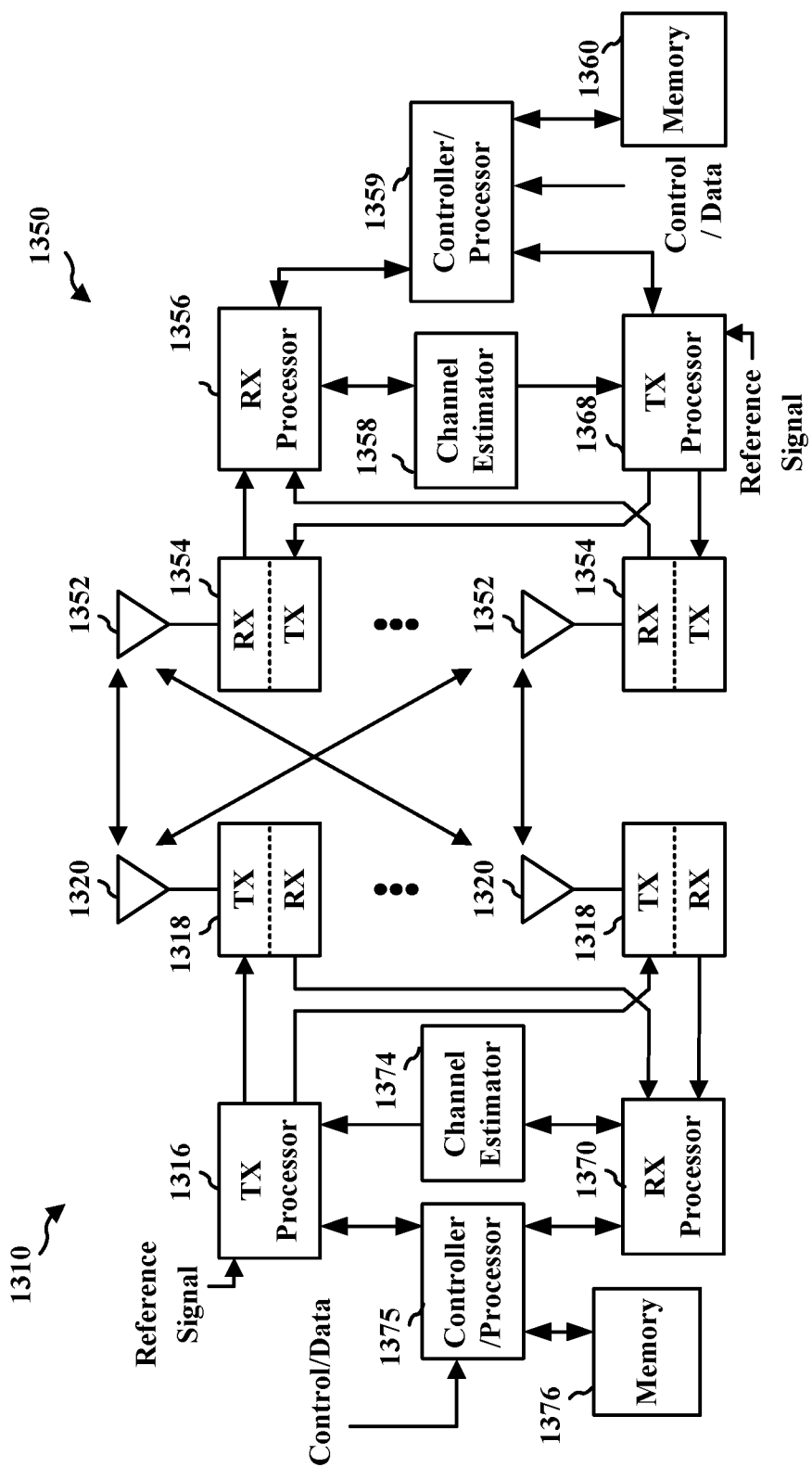
FIG. 13 is a diagram illustrating an example of a base station and UE in an access network.

FIG. 13 is a block diagram of a base station 1310 in communication with a UE 1350 in an access network, where the base station 1310 may be an example implementation of base station 102 and where UE 1350 may be an example implementation of UE 104. In the DL, IP packets from the EPC 160 may be provided to a controller/processor 1375. The controller/processor 1375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 1375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 1316 and the receive (RX) processor 1370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 1316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1374 may be used to determine the coding and modulation scheme, as well as for spatial processing. The channel estimate may be derived from a reference signal and/or channel condition feedback transmitted by the UE 1350. Each spatial stream may then be provided to a different antenna 1320 via a separate transmitter 1318TX. Each transmitter 1318TX may modulate an RF carrier with a respective spatial stream for transmission.

At the UE 1350, each receiver 1354RX receives a signal through its respective antenna 1352. Each receiver 354RX recovers information modulated onto an RF carrier and provides the information to the receive (RX) processor 1356. The TX processor 1368 and the RX processor 1356 implement layer 1 functionality associated with various signal processing functions. The RX processor 1356 may perform spatial processing on the information to recover any spatial streams destined for the UE 1350. If multiple spatial streams are destined for the UE 1350, they may be combined by the RX processor 1356 into a single OFDM symbol stream. The RX processor 1356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 1310. These soft decisions may be based on channel estimates computed by the channel estimator 1358. The soft decisions are then decoded and deinterleaved to recover the data and control signals that were originally transmitted by the base station 1310 on the physical channel. The data and control signals are then provided to the controller/processor 1359, which implements layer 3 and layer 2 functionality.

The controller/processor 1359 can be associated with a memory 1360 that stores program codes and data. The memory 1360 may be referred to as a computer-readable medium. In the UL, the controller/processor 1359 provides demultiplexing between transport and logical channels, packet reassembly, deciphering, header decompression, and control signal processing to recover IP packets from the EPC 160. The controller/processor 1359 is also responsible for error detection using an ACK and/or NACK protocol to support HARQ operations.

Similar to the functionality described in connection with the DL transmission by the base station 1310, the controller/processor 1359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 1358 from a reference signal or feedback transmitted by the base station 1310 may be used by the TX processor 1368 to select the appropriate coding and modulation schemes, and to facilitate spatial processing. The spatial streams generated by the TX processor 1368 may be provided to different antenna 1352 via separate transmitters 1354TX. Each transmitter 1354TX may modulate an RF carrier with a respective spatial stream for transmission.

The UL transmission is processed at the base station 1310 in a manner similar to that described in connection with the receiver function at the UE 1350. Each receiver 1318RX receives a signal through its respective antenna 1320. Each receiver 1318RX recovers information modulated onto an RF carrier and provides the information to a RX processor 1370.

The controller/processor 1375 can be associated with a memory 1376 that stores program codes and data. The memory 1376 may be referred to as a computer-readable medium. In the UL, the controller/processor 1375 provides demultiplexing between transport and logical channels, packet reassembly, deciphering, header decompression, control signal processing to recover IP packets from the UE 1350. IP packets from the controller/processor 1375 may be provided to the EPC 160. The controller/processor 1375 is also responsible for error detection using an ACK and/or NACK protocol to support HARQ operations.

At least one of the TX processor 1368, the RX processor 1356, and the controller/processor 1359 may be configured to perform aspects in connection with sidelink synchronization component 142 of FIG. 1.

SOME FURTHER EXAMPLE IMPLEMENTATIONS

A first example method for wireless communications, comprising configuring, by a user equipment (UE), a gap symbol as a last symbol of a sidelink synchronization signal block (S-SSB); configuring, by the UE, at least one symbol of a sidelink secondary synchronization signal (S-SSS) prior and adjacent to the gap symbol; and transmitting, by the UE, the S-SSB.

A second example method for wireless communications, comprising configuring, by a user equipment (UE), a symbol of a physical sidelink broadcast channel (PSBCH) as a first symbol of a sidelink synchronization signal block (S-SSB); configuring, by the UE, at least one symbol of a sidelink secondary synchronization signal (S-SSS) following the symbol of the PSBCH; and transmitting, by the UE, the S-SSB.

A third example method for wireless communications, comprising selecting, by a user equipment (UE), at least one symbol of a sidelink primary synchronization signal block (S-PSS) associated with a first maximum power reduction (MPR); selecting, by the UE, at least one symbol of a sidelink secondary synchronization signal block (S-SSS) associated with a second maximum power reduction (MPR); configuring a sidelink synchronization signal block (S-SSB) including the at least one symbol of the S-SSS and the at least one symbol of the S-PSS; and transmitting, by the UE, all symbols of the S-SSB with a third MPR that is equal to an upper bound of the first MPR and the second MPR.

The third example method, wherein the first MPR is equal to the second MPR and equal to the third MPR.

Any of the above two methods, further comprising selecting the at least one symbol of the S-SSS from a set of sequences all having the third MPR.

The third example method, wherein the second MPR is dependent on a sequence identifier of the at least one symbol of the S-SSS, wherein the third MPR is equal to the second MPR and greater than the first MPR.

Any of the above method or the third example method, further comprising including one or more additional symbols in the S-SSB for one or more components of the S-SSB whose MPR is less than the third MPR.

An apparatus for wireless communication, comprising a transceiver; a memory configured to store instructions; and one or more processors communicatively coupled with the transceiver and the memory, wherein the one or more processors are configured to execute the instructions to perform the operations of any of the above methods.

An apparatus for wireless communication, comprising means for performing the operations of any of the above methods.

A computer-readable medium, comprising code executable by one or more processors to perform the operations of any of the above methods.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    selecting, by a user equipment (UE), at least one symbol of a sidelink primary synchronization signal block (S-PSS) having a first peak-to-average power ratio (PAPR) associated with a first maximum power reduction (MPR);
    selecting, by the UE, at least one symbol of a sidelink secondary synchronization signal block (S-SSS) having a second PAPR that is different than the first PAPR and is associated with a second MPR that is different than the first MPR;
    configuring, by the UE, a sidelink synchronization signal block (S-SSB) including the at least one symbol of the S-SSS and the at least one symbol of the S-PSS; and
    transmitting, by the UE, all symbols of the S-SSB with a third MPR that is equal to an upper bound of the first MPR and the second MPR.

2. The method of claim 1, wherein the first MPR is equal to the second MPR and equal to the third MPR.

3. The method of claim 2, further comprising:
    selecting the at least one symbol of the S-SSS from a set of sequences all having the third MPR.

4. The method of claim 1, wherein the second MPR is dependent on a sequence identifier of the at least one symbol of the S-SSS, wherein the third MPR is equal to the second MPR and greater than the first MPR.

5. The method of claim 4, further comprising:
    including one or more additional symbols in the S-SSB for one or more components of the S-SSB whose MPR is less than the third MPR.

6. A user equipment (UE), comprising:
    a transceiver;
    a memory configured to store instructions; and
    one or more processors communicatively coupled with the transceiver and the memory, wherein the one or more processors are configured to execute the instructions to perform wireless communication comprising:
        selecting at least one symbol of a sidelink primary synchronization signal block (S-PSS) having a first peak-to-average power ratio (PAPR) associated with a first maximum power reduction (MPR);
        selecting at least one symbol of a sidelink secondary synchronization signal block (S-SSS) having a second PAPR that is different than the first PAPR and is associated with a second MPR that is different than the first MPR;
        configuring a sidelink synchronization signal block (S-SSB) including the at least one symbol of the S-SSS and the at least one symbol of the S-PSS; and
        transmitting all symbols of the S-SSB with a third MPR that is equal to an upper bound of the first MPR and the second MPR.

7. The UE of claim 6, wherein the first MPR is equal to the second MPR and equal to the third MPR.

8. The UE of claim 7, wherein the one or more processors are configured to further execute the instructions to select the at least one symbol of the S-SSS from a set of sequences all having the third MPR.

9. The UE of claim 6, wherein the second MPR is dependent on a sequence identifier of the at least one symbol of the S-SSS, wherein the third MPR is equal to the second MPR and greater than the first MPR.

10. The UE of claim 9, wherein the one or more processors are configured to further execute the instructions to include one or more additional symbols in the S-SSB for one or more components of the S-SSB whose MPR is less than the third MPR.

11. A user equipment (UE) for wireless communication, comprising:
    means for selecting at least one symbol of a sidelink primary synchronization signal block (S-PSS) having a first peak-to-average power ratio (PAPR) associated with a first maximum power reduction (MPR);
    means for selecting at least one symbol of a sidelink secondary synchronization signal block (S-SSS) having a second PAPR that is different than the first PAPR and is associated with a second MPR that is different than the first MPR;
    means for configuring a sidelink synchronization signal block (S-SSB) including the at least one symbol of the S-S SS and the at least one symbol of the S-PSS; and
    means for transmitting all symbols of the S-SSB with a third PAPR that is equal to an upper bound of the first MPR and the second MPR.

12. A non-transitory computer-readable medium comprising code executable by one or more processors of a user equipment (UE) to perform wireless communication comprising:
    selecting at least one symbol of a sidelink primary synchronization signal block (S-SSS) having a first peak-to-average power ratio (PAPR) associated with a first maximum power reduction (MPR);
    selecting at least one symbol of a sidelink secondary synchronization signal block (S-SSS) having a second PAPR that is different than the first PAPR and is associated with a second MPR that is different than the first MPR;
    configuring a sidelink synchronization signal block (S-SSB) including the at least one symbol of the S-SSS and the at least one symbol of the S-PSS; and
    transmitting all symbols of the S-SSB with a third MPR that is equal to an upper bound of the first MPR and the second MPR.

* * * * *